United States Patent
Hirose et al.

(10) Patent No.: US 10,151,622 B2
(45) Date of Patent: *Dec. 11, 2018

(54) COMBINATION WEIGHING DEVICE FOR WEIGHING ARTICLES CONVEYED TO A HOPPER

(71) Applicant: ISHIDA CO., LTD., Kyoto (JP)

(72) Inventors: Osamu Hirose, Ritto (JP); Toshiharu Kageyama, Ritto (JP); Takuyu Kubo, Ritto (JP); Yoshito Inazumi, Ritto (JP); Shinya Ikeda, Ritto (JP); Satoshi Konishi, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 165 days.

This patent is subject to a terminal disclaimer.

(21) Appl. No.: 15/112,323

(22) PCT Filed: Jan. 28, 2015

(86) PCT No.: PCT/JP2015/052343
§ 371 (c)(1),
(2) Date: Jul. 18, 2016

(87) PCT Pub. No.: WO2015/115475
PCT Pub. Date: Aug. 6, 2015

(65) Prior Publication Data
US 2016/0341596 A1 Nov. 24, 2016

(30) Foreign Application Priority Data
Jan. 30, 2014 (JP) .................................. 2014-015612

(51) Int. Cl.
*G01G 19/387* (2006.01)
*G01G 19/393* (2006.01)

(52) U.S. Cl.
CPC ......... *G01G 19/387* (2013.01); *G01G 19/393* (2013.01)

(58) Field of Classification Search
CPC .......................... G01G 19/387; G01G 19/393
See application file for complete search history.

(56) References Cited

U.S. PATENT DOCUMENTS

| 4,548,286 A | 10/1985 | Sashiki et al. |
| 4,708,215 A | 11/1987 | Nakamura et al. |

(Continued)

FOREIGN PATENT DOCUMENTS

| EP | 0112664 A2 | 7/1984 |
| JP | 06-043012 A | 2/1994 |

(Continued)

OTHER PUBLICATIONS

Computer translation of JP 2013-250143 A from the JPO website, Feb. 26, 2018.*

(Continued)

*Primary Examiner* — Randy Gibson
(74) *Attorney, Agent, or Firm* — Studebaker & Brackett PC (57) ABSTRACT

The object of the present invention is to provide a combination weighing device in which supply of articles at an article conveyance part is controlled with good precision. A combination weighing device (100) is provided with article conveyance parts (10, 20) having loading parts (11, 21) of articles and driving parts (12, 22) for driving the loading parts, the article conveyance parts (10, 20) driving the driving parts and thereby causing the articles to be conveyed to hoppers (30) arranged downstream in a conveyance direction, a sensing part (60) for sensing, in non-contact manner, a state of the articles on the loading parts, and a supply control part (82*c*) for controlling supply of the articles by controlling driving of the article conveyance parts based on a sensing result of the sensing part. The sensing part sense, for a plurality of regions along the conveyance direction, the state of the articles for each of the regions. The (Continued)

supply control part controls the driving based on a physical quantity relating to a height of the articles on the loading parts for each of the regions, the height being ascertained from the state of the articles of each of the regions.

19 Claims, 7 Drawing Sheets

(56) References Cited

U.S. PATENT DOCUMENTS

| | | | |
|---|---|---|---|
| 4,711,345 A | 12/1987 | Fukuda et al. | |
| 5,270,495 A * | 12/1993 | Mosher | G01G 13/026 177/25.18 |
| 5,753,866 A * | 5/1998 | Ikeda | G01G 19/393 177/119 |
| 9,417,115 B2 * | 8/2016 | Tamai | G01G 19/387 |
| 9,651,414 B2 * | 5/2017 | Hofer | G01G 19/393 |
| 2015/0021103 A1 * | 1/2015 | Tamai | G01G 19/393 177/25.18 |
| 2015/0129323 A1 * | 5/2015 | Tamai | G01G 19/393 177/25.18 |

FOREIGN PATENT DOCUMENTS

| | | |
|---|---|---|
| JP | 2004-107077 A | 4/2004 |
| JP | 2005-162394 A | 6/2005 |
| JP | 2013-250143 A | 12/2013 |
| WO | 95/31702 A1 | 11/1995 |
| WO | 2013/137008 A1 | 9/2013 |

OTHER PUBLICATIONS

Computer translation of WO 2013/137008 from the EPO website, Feb. 26, 2018.*

Computer translation of WO 95/31702 A1, Feb. 26, 2018.*

International Search Report issued in PCT/JP2015/052343; dated Feb. 24, 2015.

The extended European search report issued by the European Patent Office dated Jan. 11, 2017, which corresponds to European Patent Application No. 15743210.5-1557 and is related to U.S. Appl. No. 15/112,323.

International Preliminary Report on Patentability issued in PCT/JP2015/052343; dated Aug. 2, 2016.

* cited by examiner

| NAME | CONVEYANCE REGION | | | | |
|---|---|---|---|---|---|
| DISPERSING TABLE | DR0 | | | | |
| RADIAL TROUGH a | Ra-1-1 | Ra-2-1 | Ra-3-1 | Ra-4-1 | Ra-5-1 |
| | Ra-1-2 | Ra-2-2 | Ra-3-2 | Ra-4-2 | Ra-5-2 |
| RADIAL TROUGH b | Rb-1-1 | Rb-2-1 | Rb-3-1 | Rb-4-1 | Rb-5-1 |
| | Rb-1-2 | Rb-2-2 | Rb-3-2 | Rb-4-2 | Rb-5-2 |
| . | . | . | . | . | . |
| . | . | . | . | . | . |
| RADIAL TROUGH k | Rk-1-1 | Rk-2-1 | Rk-3-1 | Rk-4-1 | Rk-5-1 |
| | Rk-1-2 | Rk-2-2 | Rk-3-2 | Rk-4-2 | Rk-5-2 |
| . | . | . | . | . | . |
| . | . | . | . | . | . |
| RADIAL TROUGH n | Rn-1-1 | Rn-2-1 | Rn-3-1 | Rn-4-1 | Rn-5-1 |
| | Rn-1-2 | Rn-2-2 | Rn-3-2 | Rn-4-2 | Rn-5-2 |

F I G. 7

COMBINATION WEIGHING DEVICE FOR WEIGHING ARTICLES CONVEYED TO A HOPPER

TECHNICAL FIELD

The present invention relates to a combination weighing device.

BACKGROUND ART

Combination weighing devices are conventionally known in which articles are weighed in numerous weighing hoppers and a combination of articles within a predetermined weight is selected. For example, in the combination weighing device disclosed in Patent Literature 1 (Republished Patent Application WO 95/31702), images of a dispersing part and a radial part is captured by an imaging means, the height of articles is ascertained and compared with a predetermined value, and a conveyed quantity is distinguished as being small when the ascertained height is less than the predetermined value, and the conveyed quantity is distinguished as being large when the ascertained height is greater than the predetermined value. An increase or decrease in a delivered quantity of articles according to a charging target value is estimated, and the radial part is controlled.

In the device disclosed in Patent Literature 2 (Japanese Laid-open Patent Publication No. 2013-250143), images of radial parts are captured at different image capture times by an imaging means, the images of the radial parts and the times thereof are associated and recorded, and a difference between the images of radial parts from different times is obtained, whereby congestion of articles is sensed for the radial parts overall or for each of a plurality of regions along a conveyance direction of the radial parts. Control for responding to a conveyance abnormality is then performed for a congested radial part.

SUMMARY OF THE INVENTION

Technical Problem

However, in the device disclosed in Patent Literature 1 (Republished Patent Application WO 95/31702), because the height of the articles is judged solely by height relative to the predetermined value, only a trend in the conveyed quantity can be estimated, and accurate control of a supplied quantity is not possible.

Although congestion of articles can be eliminated in the device disclosed in Patent Literature 2 (Japanese Laid-open Patent Publication No. 2013-250143), Patent Literature 2 does not disclose anything regarding accurate supply control.

An object of the present invention is therefore to provide a combination weighing device whereby supplying of articles in an article conveyance part is controlled with good precision.

Solution to Problem

A combination weighing device according to a first aspect of the present invention is provided with an article conveyance part having a loading part of articles and a driving part configured to drive the loading part, the article conveyance part configured to drive the driving part and thereby cause the articles to be conveyed to hoppers arranged downstream in a conveyance direction; a sensing part configured to sense, in non-contact manner, a state of the articles on the loading part; and a supply control part configured to control supply of the articles by controlling driving of the article conveyance part based on a sensing result of the sensing part. The sensing part is configured to sense, for a plurality of regions along the conveyance direction, the state of the articles for each of the regions. The supply control part is configured to control the driving based on a physical quantity relating to a height of the articles on the loading part for each of the regions, the physical quantity being ascertained from the state of the articles of each of the regions.

The combination weighing device according to the first aspect of the present invention enables supply control based on a specific quantitative value (a physical quantity relating to the height of the articles on the loading part), in contrast with rough supply control using a trend in a conveyed quantity, such as in the prior art. In particular, in the combination weighing device according to the first aspect of the present invention, because the physical quantity is precisely calculated for each region along the conveyance direction and supply is then controlled based on the calculated value, supply can be accurately controlled. The weighing precision of the combination weighing device is therefore enhanced.

A combination weighing device according to a second aspect of the present invention is the combination weighing device according to the first aspect of the present invention, wherein the combination weighing device is further provided a storage part configured to store the physical quantity for each of the regions in associate with a time. The supply control part is configured to control the driving based on the physical quantity for each of the regions being stored in associated with the time in the storage part.

In the combination weighing device according to the second aspect of the present invention, supply control corresponding to a supply desired for a next combination weighing, a determination as to the propriety of supply based on a next estimated combination result, or a determination as to the propriety of additional supply can be suitably executed, and the combination weighing device can therefore be operated with increased weighing precision and/or without reduction in working efficiency.

A combination weighing device according to a third aspect of the present invention is the combination weighing device according to the first or second aspect of the present invention, wherein the combination weighing device is further provided with a height calculating part configured to calculate a height of the articles on the loading part for each of the regions as the physical quantity for each of the regions, based on the sensing result of the sensing part.

In the combination weighing device according to the third aspect of the present invention, because the control is possible based on the height of the articles on the loading part, the supply can be controlled accurately and the weighing precision of the combination weighing device is easily enhanced.

A combination weighing device according to a fourth aspect of the present invention is the combination weighing device according to the first or second aspect of the present invention, wherein the combination weighing device is further provided with a loading quantity calculating part configured to calculate a loading quantity of the articles on the loading part for each of the regions as the physical quantity for each of the regions, based on the sensing result of the sensing part.

In the combination weighing device according to the fourth aspect of the present invention, because the control is possible based on the loading quantity of the articles on the loading part, the supply can be controlled accurately and the weighing precision of the combination weighing device is easily enhanced.

A combination weighing device according to a fifth aspect of the present invention is the combination weighing device according to any of the first through fourth aspects of the present invention, wherein the sensing part is configured to sense the state of the articles at each of a predetermined cycle.

In the combination weighing device according to the fifth aspect of the present invention, real time control is possible and the physical quantity relating to the height of the articles on the loading part can be more accurately calculated. Because the supply can be controlled based on an accurate physical quantity, the precision of combination weighing by the combination weighing device is enhanced.

In a combination weighing device according to another aspect of the present invention, the height calculating part calculates the height of the articles in correlation with a width direction of the conveyance direction. The supply control part controls the driving of the article conveyance part based on the height of the articles of each of the regions being correlated with the width direction of the conveyance direction.

In the configuration of Patent Literature 1 (Republished Patent Application WO 95/31702), because the height of the articles is ascertained by capturing an image from a lateral direction, only one height of the articles can be ascertained for the width direction of the conveyance direction. In the present invention, however, the height of the articles is further calculated for each region with respect to the width direction of the conveyance direction, and the supply can therefore be controlled more accurately. The precision of combination weighing by the combination weighing device is therefore enhanced.

Advantageous Effects of Invention

In the combination weighing device according to the present invention, the supply of articles in the article conveyance parts is controlled with good precision, and the combination weighing device can thereby be operated with increased weighing precision and/or without reduction in working efficiency.

DESCRIPTION OF EMBODIMENTS

First Embodiment

A combination weighing device 100 according to an embodiment of the present invention is described below with reference to the accompanying drawings.

(1) Overall Configuration

Figure 1:
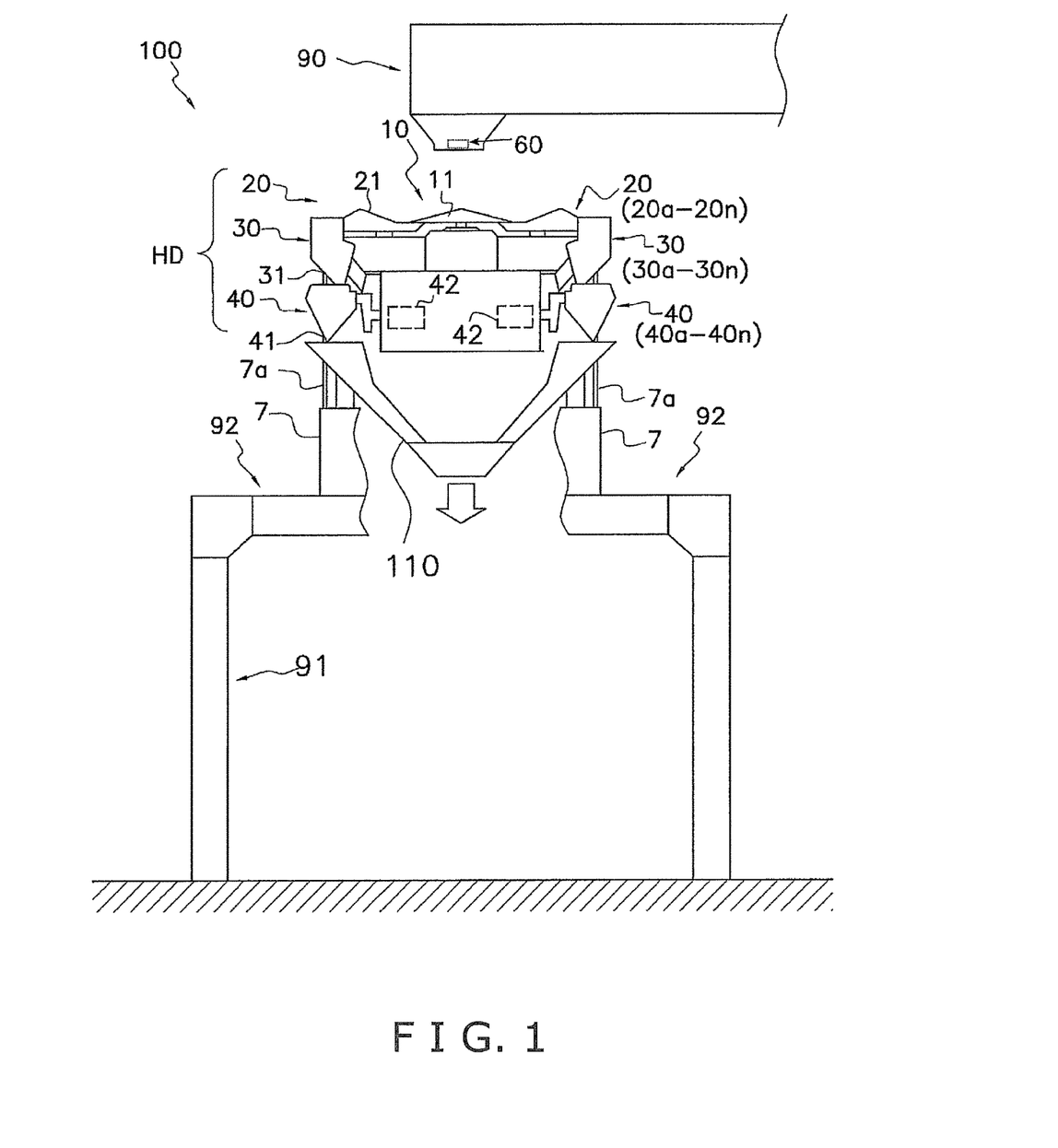
FIG. 1 is a longitudinal sectional schematic view of the combination weighing device according to an embodiment of the present invention.

A schematic view of the combination weighing device 100 according to an embodiment of the present invention is shown in FIG. 1. In the combination weighing device 100, articles are supplied to a dispersing part 10 from an article supplying unit 90, and the articles are then supplied from the dispersing part 10 to a plurality of radial parts 20 arranged radially around the dispersing part 10. In the combination weighing device 100, pool hoppers 30 are provided so as to correspond with each of the radial parts 20 on downstream in a conveyance direction of the radial part 20, and the articles from the radial parts 20 are temporarily retained in the pool hoppers 30.

Weighing hoppers 40 are arranged below the pool hoppers 30 so that each of the weighing hoppers 40 corresponds to one of the pool hoppers 30, and each weighing hopper 40 receives articles discharged from the pool hopper 30 corresponding thereto. Each of the plurality of weighing hoppers 40 measures a weight of the articles retained therein, and a combination calculation is performed based on the weighing values of the weighing hoppers 40. A combination of articles in which a result of the combination calculation has a value within a predetermined allowable range is selected, and the articles are discharged from the weighing hoppers 40 pertaining to that combination.

The combination weighing device 100 is arranged above a packaging device or the like not illustrated in the drawings. As illustrated in FIG. 1, the combination weighing device 100 is arranged above a frame 91 provided in the vicinity of the packaging device. Work passages 92 are provided on all four sides of the combination weighing device 100 so that workers can access the combination weighing device 100 when abnormalities occur and/or for maintenance.

Figure 3:
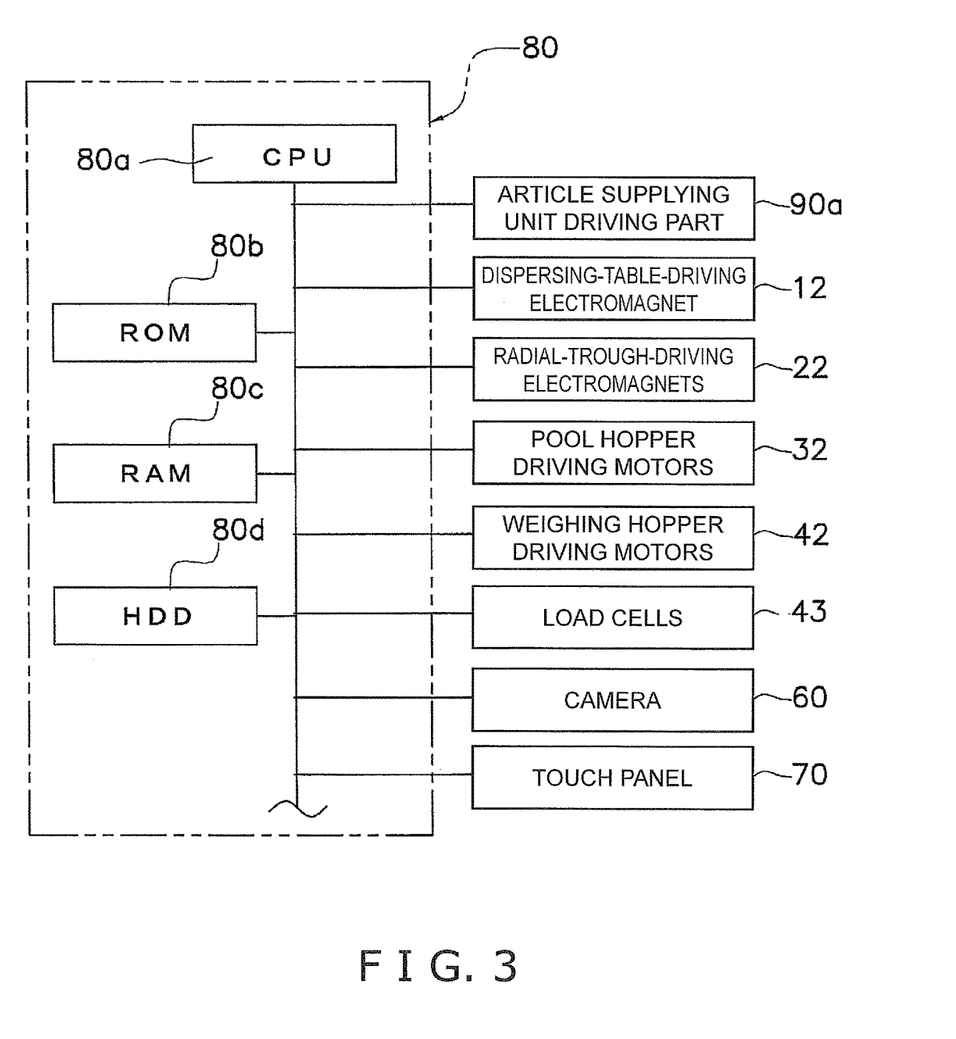
FIG. 3 is a control block diagram of the combination weighing device.

As illustrated in FIGS. 1 and 3, the combination weighing device 100 has primarily the article supplying unit 90, the dispersing part 10, the plurality of radial parts 20 (20a through 20n), the plurality of pool hoppers 30 (30a through 30n), and the plurality of weighing hoppers 40 (40a through 40n), and a single collecting chute 110, a camera 60, a touch panel 70, and a control device 80.

Figure 2:
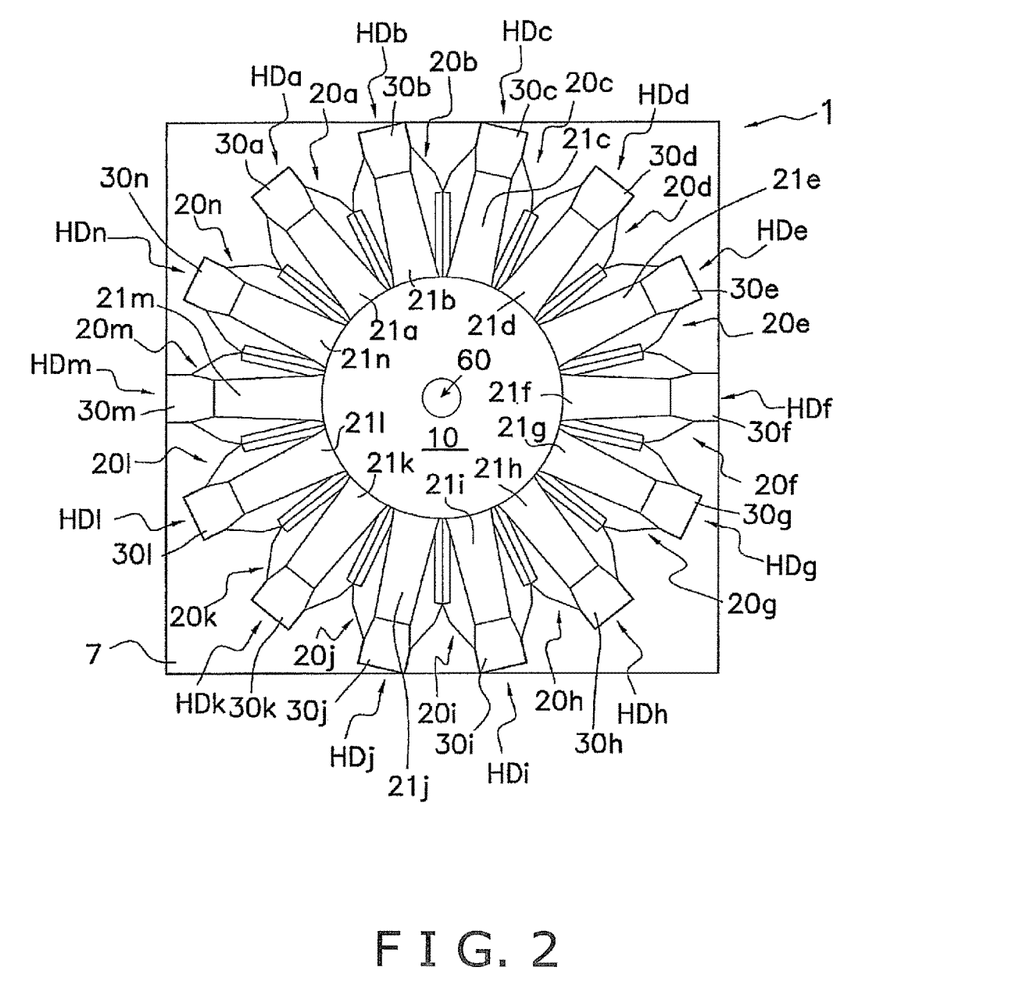
FIG. 2 is a schematic plan view of the combination weighing device.

In the present embodiment, the combination weighing device 100 is provided with fourteen radial parts 20, fourteen pool hoppers 30, and fourteen weighing hoppers 40. Heads HD (HDa through HDn) are respectively configured from the plurality of radial parts 20 (20a through 20n), the plurality of pool hoppers 30 (30a through 30n), and the plurality of weighing hoppers 40 (40a through 40n). As illustrated in FIG. 2, the heads HDa through HDn are arranged in the circumferential direction of the dispersing part annularly about the dispersing part 10 in plan view. An identification number 1 through 14 is assigned to each of the heads HDa through HDn. In FIG. 2, the heads HD assigned the identification numbers 1 through 14 are illustrated as heads HDa through HDn, respectively. The heads HDa through HDn are arranged so that the identification numbers of the heads HDa through HDn increase in a clockwise direction. The radial parts 20 (20a through 20n), the pool hoppers 30 (30a through 30n), and the weighing hoppers 40

(40*a* through 40*n*) constituting the heads HDa through HDn are also assigned the same identification numbers (1 through 14) as the respective heads HDa through HDn thereof.

Radial parts 20*a* through 20*n*, pool hoppers 30*a* through 30*n*, and weighing hoppers 40*a* through 40*n* belonging to the same heads HDa through HDn, respectively, are correlated with each other.

In the combination weighing device 100, articles are conveyed from the article supplying unit 90 to the dispersing part 10, and the articles are then conveyed from the dispersing part 10 to the radial parts 20*a* through 20*n*. The articles are then supplied from the radial parts 20*a* through 20*n* to the pool hoppers 30*a* through 30*n* respectively correlated with the radial parts 20*a* through 20*n*. The articles supplied to the pool hoppers 30*a* through 30*n* are then supplied to the weighing hoppers 40*a* through 40*n* correlated with the pool hoppers 30*a* through 30*n*. The articles are then discharged from the weighing hoppers 40*a* through 40*n* to the collecting chute 110. The articles discharged to the collecting chute 110 are then charged into the packaging device. The dispersing part 10 and the radial parts 20*a* through 20*n* in the present embodiment are described as article conveyance parts.

(2) Detailed Configuration (2-1) Article Supplying Unit

The article supplying unit 90 is a unit for supplying articles to the dispersing part 10. As illustrated in FIG. 1, the article supplying unit 90 is arranged above the dispersing part 10. The article supplying unit 90 is driven by an article supplying unit driving part 90*a* (see FIG. 3).

An operation/stoppage state of the article supplying unit 90 and a quantity of articles conveyed thereby are varied based on a control instruction sent from the control device 80 described hereinafter.

(2-2) Dispersing Part

The dispersing part 10 is a unit for receiving articles conveyed from the article supplying unit 90 described above and conveying the received articles to the radial parts 20. Specifically, the dispersing part 10, by oscillation, disperses the articles conveyed from the article supplying unit 90 and sends the articles to the radial parts 20*a* through 20*n*.

The dispersing part 10 has primarily a dispersing table (loading part) 11. The dispersing table 11 receives the articles conveyed from the article supplying unit 90, and a lot of articles are loaded thereon. The dispersing table 11 is a flat conical-table-shaped member. The dispersing table 11 is oscillated by driving a dispersing-table-driving electromagnet 12 (see FIG. 3). In the dispersing part 10, the dispersing table 11 is oscillated, whereby the articles loaded on the dispersing table 11 are conveyed in a radial direction while being dispersed in the circumferential direction.

The dispersing-table-driving electromagnet 12 of the dispersing part 10 is controlled according to a control instruction sent from the control device 80 described hereinafter. The quantity of articles supplied from the dispersing part 10 to the radial parts 20 is also controlled according to a control instruction sent from the control device 80. The dispersing-table-driving electromagnet 12 changes the intensity (oscillation intensity) with which the dispersing table 11 oscillates and the time (oscillation time) for which the dispersing table 11 oscillates based on a control instruction. Initial set values for the oscillation intensity and the oscillation time of the dispersing table 11 are stored in a storage part 81 of the control device 80 described hereinafter. The oscillation intensity and the oscillation time can be changed using the touch panel 70 described hereinafter.

(2-3) Radial Parts

The radial parts 20 receive articles from the dispersing part 10 and supply the received articles to the pool hoppers 30. The radial parts 20 receive the articles supplied by the dispersing part 10 and supply the articles to the pool hoppers 30 arranged further downstream.

The radial parts 20*a* through 20*n* have radial troughs (loading parts) 21*a* through 21*n*, respectively, for receiving the articles conveyed by the dispersing part 10. A lot of articles are loaded on the radial troughs 21*a* through 21*n*. As illustrated in FIG. 2, the radial troughs 21*a* through 21*n* are arranged so as to extend radially around the dispersing part 10. The radial parts 20*a* through 20*n* are arranged at an outer edge of the dispersing part 10 so as to surround the dispersing part 10. The radial troughs 21*a* through 21*n* are driven and oscillated by radial-trough-driving electromagnets 22 (see FIG. 3).

In the radial parts 20, the radial troughs 21*a* through 21*n* are oscillated, whereby the articles loaded on each of the radial troughs 21*a* through 21*n* are conveyed toward an outside edge. Specifically, the radial parts 20*a* through 20*n* convey articles in a direction away from the dispersing part 10. The articles conveyed by the radial parts 20*a* through 20*n* are supplied to the pool hoppers 30*a* through 30*n* arranged below outside edges of the radial parts 20*a* through 20*n*.

The radial-trough-driving electromagnets 22 of the radial parts 20*a* through 20*n* are each controlled according to a control instruction sent from the control device 80 described hereinafter. The radial-trough-driving electromagnets 22 control each of the radial parts 20*a* through 20*n* independently. The quantity of articles conveyed from each of the radial parts 20*a* through 20*n* to the pool hoppers 30 is also controlled according to a control instruction sent from the control device 80.

The radial-trough-driving electromagnets 22 changes the oscillation intensity and oscillation time of oscillation of the radial troughs 21*a* through 21*n* based on a control instruction. Here, the oscillation time of the radial troughs 21*a* through 21*n* is the time of one cycle from when the radial-trough-driving electromagnets 22 described hereinafter start oscillation of the radial troughs 21*a* through 21*n* until the radial-trough-driving electromagnets 22 stop the oscillation. Initial set values for the oscillation intensity and the oscillation time of the radial troughs 21*a* through 21*n* are stored in the storage part 81 of the control device 80 described hereinafter. These oscillation intensity and oscillation time can be changed using the touch panel 70 described hereinafter.

(2-4) Pool Hoppers

The pool hoppers 30 temporarily retain articles supplied from the radial parts 20, and subsequently discharge the retained articles to the weighing hoppers 40 described hereinafter. The pool hoppers 30 are arranged at the outside edges of the radial parts 20. The pool hoppers 30 are also arranged below the radial parts 20 so as to receive articles falling from the radial parts 20. Specifically, the pool hoppers 30*a* through 30*n* belonging to the heads HDa through HDn are arranged below the outside edges of the radial parts 20*a* through 20*n* that belong to the same heads HDa through HDn.

The pool hoppers 30 have openings at top and bottom ends thereof. The top-end openings are openings for receiving articles falling from the radial parts 20. The bottom-end openings are openings for discharging the articles in the pool hoppers 30 to the weighing hoppers 40. Gates 31 are attached to the bottom-end openings. Specifically, the gates 31 function as bottoms of the pool hoppers 30. The gates 31 are configured so as to be capable of opening and closing. The gates 31 are driven by pool hopper driving motors 32 (see FIG. 3). The pool hopper driving motors 32 are stepping motors, for example. The pool hopper driving motors 32 are driven by the control device 80. The gates 31 attached to the pool hoppers 30a through 30n are individually controlled by the control device 80.

Specifically, each of the gates 31 is independently opened and closed. When the gates 31 are opened, the articles retained in the pool hoppers 30 are discharged to the weighing hoppers 40.

(2-5) Weighing Hoppers

The weighing hoppers 40 weigh the articles discharged by the pool hoppers 30, and then discharge the weighed articles to the collecting chute 110. The weighing hoppers 40 are arranged below the pool hoppers 30 so as to receive articles falling from the pool hoppers 30. Specifically, the weighing hoppers 40a through 40n belonging to the heads HDa through HDn are arranged below the pool hoppers 30a through 30n that belong to the same heads HDa through HDn.

The weighing hoppers 40 also have openings at top and bottom ends thereof. The top-end openings are openings for receiving articles falling from the pool hoppers 30. The bottom-end openings are openings for sending the articles in the weighing hoppers 40 to the collecting chute 110. Gates 41 are attached to the bottom-end openings. Specifically, the gates 41 function as bottoms of the weighing hoppers 40. The gates 41 are configured so as to be capable of opening and closing. The gates 41 are driven by weighing hopper driving motors 42 (see FIG. 3). The weighing hopper driving motors 42 are stepping motors, for example. The weighing hopper driving motors 42 are driven by the control device 80. The gates 41 attached to the weighing hoppers 40a through 40n are individually controlled by the control device 80. Specifically, each of the gates 41 is independently opened and closed. When the gates 41 are opened, the articles retained in the weighing hoppers 40 fall into the collecting chute 110.

Each of the weighing hoppers 40a through 40n has a load cell 43. The articles retained by the weighing hoppers 40a through 40n are weighed by the load cells 43. Results of article weighing by the load cells 43 are sent as weighing values as needed to the control device 80 described hereinafter.

(2-6) Collecting Chute

The collecting chute 110 collects the articles discharged from the weighing hoppers 40 and discharges the articles out of the combination weighing device 100. The discharged articles are discharged to a packaging machine or the like arranged below the collecting chute 110 and not illustrated in the drawings.

(2-7) Camera

The camera 60 is an example of the sensing part. The camera 60 continuously captures an image (conveyance part image) of the conveyance parts. The camera 60 is a so-called time-of-flight (TOF)-type camera, and is configured from an illumination part and an imaging part not illustrated in the drawings. The TOF-type camera used in the present embodiment outputs a distance from the camera 60, regarding a corresponding surface of which an image is captured by the camera 60, for each conveyance region stored in a conveyance region position storage part 81d described hereinafter. In other words, the camera 60 senses a state of articles in non-contact manner for each conveyance region stored in the conveyance region position storage part 81d described hereinafter. Specifically, for each conveyance region stored in the conveyance region position storage part 81d described hereinafter, the camera 60 senses the distance from the camera 60 to an imaging subject in non-contact manner and outputs a sensing result.

The term "loading parts" refers to the dispersing table 11 of the dispersing part 10 and the radial troughs 21 of the radial parts 20, as described above. The conveyance part image includes an image of the dispersing table 11 and the radial troughs 21, as well as of the articles on the dispersing table 11 and the radial troughs 21.

As illustrated in FIG. 1, the camera 60 is arranged in a center part of a discharge part of the article supplying unit 90. Specifically, the camera 60 captures an image of the loading parts from directly above the dispersing part 10. The conveyance part image is an image captured from directly above the dispersing part 10.

As illustrated in FIG. 2, the camera 60 is arranged in a center position of the dispersing part 10 in plan view. Specifically, a single camera 60 is provided in the combination weighing device 100 according to the present embodiment. A lens of the camera 60 faces toward the center of the dispersing part 10. The number of cameras 60 herein is given by way of example, and there may be provided a plurality of cameras 60.

The camera 60 captures an image for each weighing cycle described hereinafter, and the distance from the camera 60 to each of the conveyance regions set in the conveyance region position storage part 81d described hereinafter is outputted for each weighing cycle. In other words, for each weighing cycle, the camera 60 senses the state of the articles on a loading part for each conveyance region stored in the conveyance region position storage part 81d described hereinafter.

(2-8) Touch Panel

The touch panel 70 is a liquid crystal display (LCD). The touch panel 70 functions as an input part and a display part. The touch panel 70 receives various types of settings relating to combination weighing. The touch panel 70 also displays an operating condition and/or setting information of the combination weighing device 100. The operating condition includes the operating/stoppage condition of the combination weighing device 100, weight values of articles weighed by the weighing hoppers 40a through 40n, combination weighing results, and the like. The operating condition of the combination weighing device 100 displayed on the touch panel 70 changes in substantially real time. The operating condition of the combination weighing device 100 also includes a warning indicating a conveyance abnormality. A warning is displayed on the touch panel 70 when the control device 80 described hereinafter determines that an article conveyance abnormality is occurring in the article conveyance parts. The setting information is information relating to initial settings and settings received by the touch panel 70.

The settings received by the touch panel 70 include the oscillation intensity and oscillation time of the dispersing table 11 and the oscillation intensity and oscillation time of each of the radial troughs 21a through 21n, described above.

The settings received by the touch panel 70 furthermore include a weighing speed setting for the combination weighing device 100, settings for the plurality of conveyance regions in the article conveyance parts, timing adjustment, and other settings.

Here, the weighing speed of the combination weighing device 100 is the number of combination weighings executed per unit time (1 minute). In the present embodiment, the combination weighing is performed once per second (weighing cycle), for example, and the weighing speed is therefore 60 combination weighings/minute.

The settings for the article conveyance regions in the article conveyance parts are settings relating to regions in which articles are conveyed by the radial parts 20a through 20n among a plurality of regions included in the conveyance part image, and a correlation thereof with the identification numbers of the radial parts 20a through 20n. The settings for the article conveyance regions in the article conveyance parts are settings for correlating what portion of the conveyance part image corresponds to what portion of an article conveyance part (what portion of either the dispersing table 11 or the radial troughs 21a through 21n).

Correlating is performed using an image of the dispersing table 11 and the radial troughs 21a through 21n displayed on the touch panel 70. The image (setting image) used for setting the correlation is displayed so that a specific region thereof can be designated on the touch panel 70.

Figure 5:
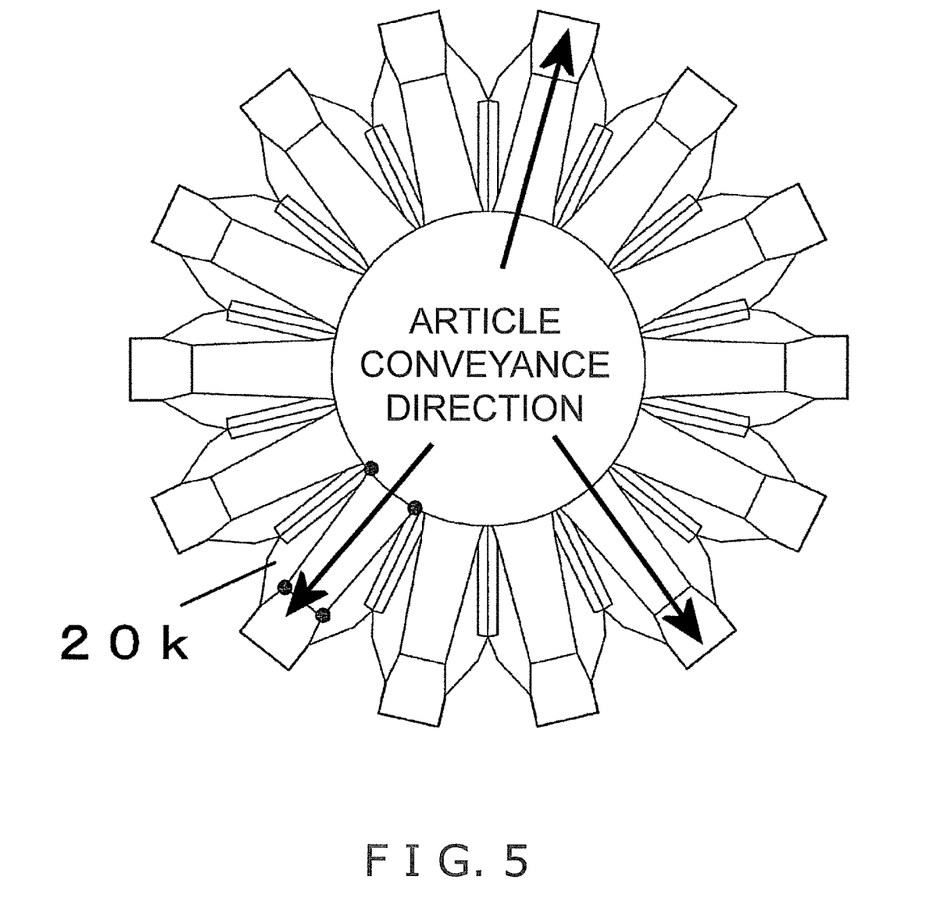
FIG. 5 is a view illustrating an example of the image for setting displayed on the touch panel.

For example, as illustrated in FIG. 5, points included in the setting image (e.g., the four black circles in FIG. 5) are designated, and a region surrounded by the points is thereby set as a region (a conveyance region) in which articles are conveyed by a specific feeder (radial part 20).

Figure 6:
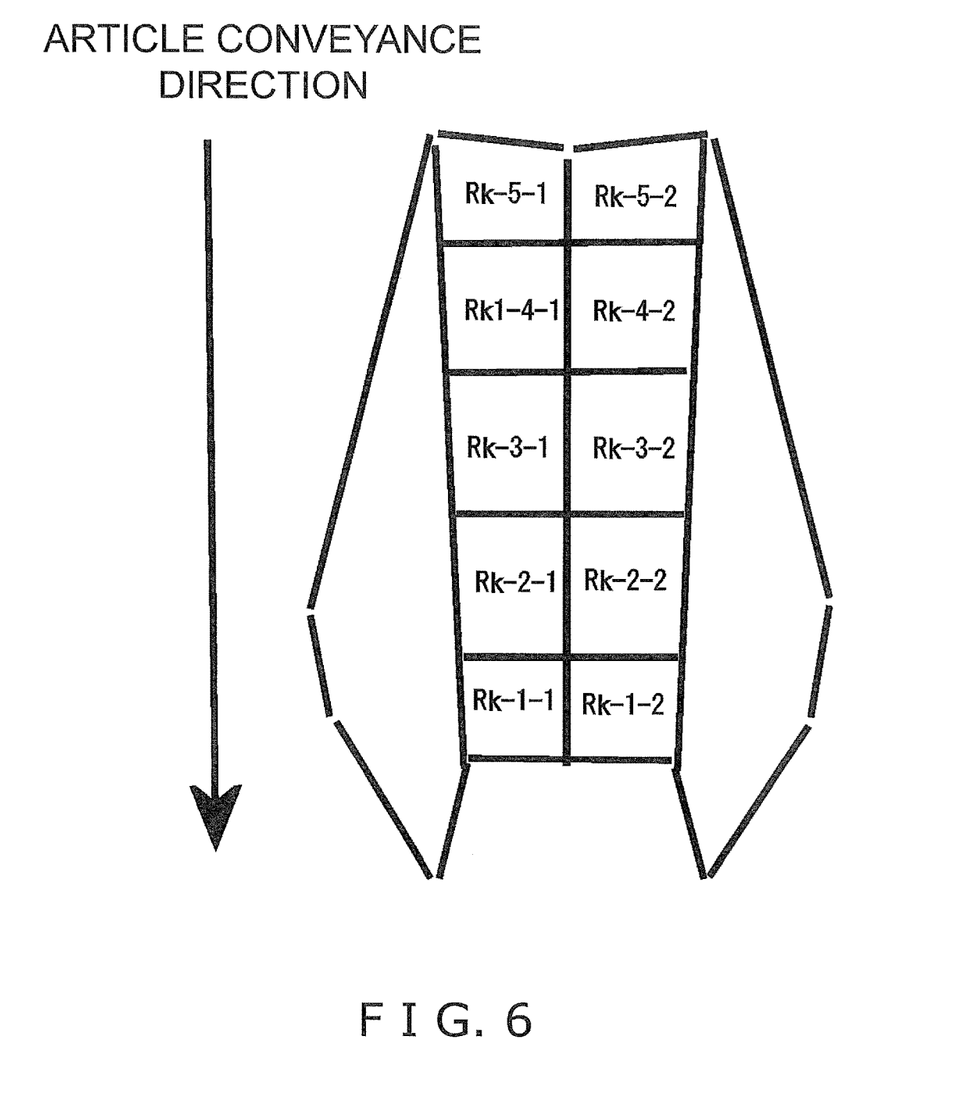
FIG. 6 is a graphical illustration relating to the designation of conveyance regions of a radial part (plan view).

As illustrated in FIG. 6, conveyance regions are further subdivided and set.

Figure 7:
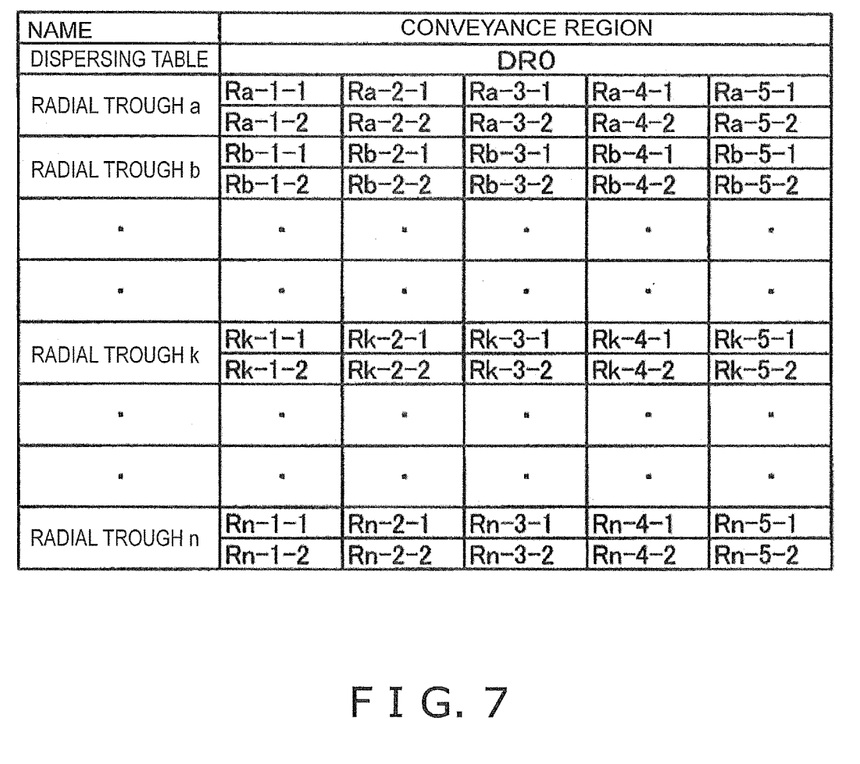
FIG. 7 is a view illustrating the manner how positions of conveyance regions are stored in a storage region.

Information of the correlation between a conveyance region on the setting image and the dispersing table 11 and the radial parts 20a through 20n is thereby generated (see FIG. 7).

Timing adjustment, which is one setting received by the touch panel 70, is a timing adjustment relating to the timing or the like of driving the opening and closing of the gates 31 of the pool hoppers 30 and the gates 41 of the weighing hoppers 40.

The settings received by the touch panel 70 are stored in the storage part 81 of the control device 80 described hereinafter.

(2-9) Control Device

The control device 80 is a device for controlling the combination weighing device 100. As illustrated in FIG. 3, the control device 80 is connected to the article supplying unit driving part 90a, the dispersing-table-driving electromagnet 12, the radial-trough-driving electromagnets 22, the pool hopper driving motors 32, the weighing hopper driving motors 42, the load cells 43, the camera 60, the touch panel 70, and other components.

The control device 80 has a CPU 80a, a ROM 80b, a RAM 80c, and an HDD 80d. The control device 80 functions as the storage part 81 and a computation part 82. The storage part 81 and the computation part 82 will be described below using FIG. 4.

(2-9-1) Storage Part

The storage part 81 is configured from a ROM 80b, a RAM 80c, and an HDD 80d. The storage part 81 stores a program read and executed by the CPU, and/or various types of settings received by the touch panel 70, various types of data necessary for computational processing, operating data and/or results obtained from computational processing, and the like.

Figure 4:
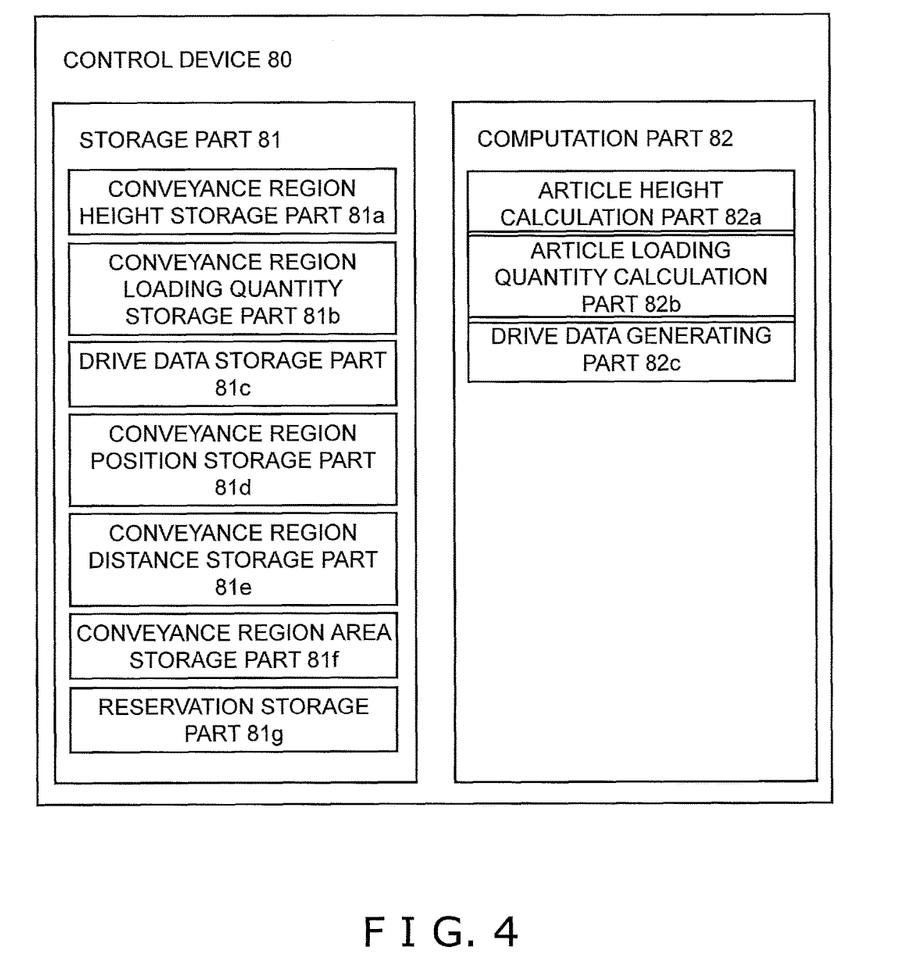
FIG. 4 is a function block diagram of the control device of the combination weighing device.

The storage part 81 has primarily a conveyance region height storage part 81a, a conveyance region loading quantity storage part 81b, a driving data storage part 81c, a conveyance region position storage part 81d, a conveyance region distance storage part 81e, a conveyance region area storage part 81f, and a reservation storage part 81g.

(a) Conveyance Region Height Storage Part

The conveyance region height storage part 81a stores an article height for each of the later-described conveyance regions of the article conveyance parts, which is calculated by a later-described article height calculation part 82a with image capturing by the camera 60.

In the conveyance region height storage part 81a, the height of the articles of each conveyance region is stored in association with a time for each aforementioned weighing cycle. In the present embodiment, the conveyance region height storage part 81a stores the data for the most recent 1 hour.

(b) Conveyance Region Loading Quantity Storage Part

The conveyance region loading quantity storage part 81b stores an article loading weight for each of the conveyance regions described hereinafter of the article conveyance parts, the article loading weight being calculated by an article loading weight calculation part 82b described hereinafter.

In the conveyance region loading quantity storage part 81b, the loading quantity for each of the conveyance regions is stored in association with a time for each aforementioned weighing cycle. In the present embodiment, the conveyance region loading quantity storage part 81b stores the data for the most recent 1 hour.

(c) Driving Data Storage Part

Driving data of each configuration included in the combination weighing device 100 are stored in the driving data storage part 81c. The driving data include, for example, a drive state (whether supplying articles or not) of the article supplying unit 90, an open/close state (ON/OFF) of the gates 31 of the pool hoppers 30 and the gates 41 of the weighing hoppers 40, and other data.

The driving data furthermore include driving data of the dispersing part 10 and the radial parts 20a through 20n. The driving data of the dispersing part 10 and the radial parts 20a through 20n are data relating to the oscillation intensity and oscillation time of the dispersing part 10 and the radial parts 20a through 20n. The oscillation intensity is stored as a number from 0 to 99, and the oscillation time is stored in units of msec in the driving data storage part 81c.

In the driving data storage part 81c, information is stored in association with the time at which the driving data were obtained. In the present embodiment, the driving data storage part 81c stores the data for the most recent 1 hour.

(d) Conveyance Region Position Storage Part

The conveyance region position storage part 81d stores data indicating what portion of an imaging region corresponds to what conveyance region in the article conveyance parts (the dispersing part 10 and the radial parts 20a through 20n).

The method for designating a conveyance region will be described using the method for setting the region of the radial trough 21k of the radial part 20k.

First, a setting image is displayed on the touch panel 70, and a position corresponding to entire region of the radial trough 21k is designated by touching the touch panel at the position of the black points illustrated in FIG. 5.

A conveyance region divided into ten regions Rk-1-1 to Rk-5-2 is subsequently set as illustrated in FIG. 6. As illustrated in FIG. 6, the conveyance region of the radial trough 21k is divided into a total of ten division regions, including the left and right regions furthest downstream in the article conveyance direction are Rk-1-1 and Rk-1-2 and the left and right regions next upstream in the article conveyance direction are Rk-2-1 and Rk-2-2, by dividing it into five parts in the article conveyance direction and two parts in the width direction of the conveyance direction.

In order to accomplish the above setting, the touch panel 70 is first operated to call an Rk-1-1 portion of the conveyance region position storage part 81d illustrated in FIG. 7, and a range corresponding to the region in the setting image illustrated in FIG. 5 is designated on the touch panel 70. Coordinate values of the Rk-1-1 region are thereby set in the storage part relating to Rk-1-1 of the conveyance region position storage part 81d.

Setting is performed in the same manner for Rk-1-2 through Rk-5-2 thereafter, and setting of all of the conveyance regions of the radial trough 21k is completed.

Subsequent designating of the conveyance regions of the other radial troughs 21 and/or the conveyance regions of the dispersing table is performed in the same manner.

Designating of all of the conveyance regions is thereby completed, and the positions of all of the conveyance regions are stored in the conveyance region position storage part 81d.

(e) Conveyance Region Distance Storage Part

The conveyance region distance storage part 81e stores the distances from the camera 60 to centers of the conveyance regions set in the conveyance region position storage part 81d. The conveyance region distance storage part 81e stores, for each conveyance region, the distance to the center of each conveyance region as measured by the camera 60 in a state in which there are no articles on the dispersing part 10 and the radial parts 20.

(f) Conveyance Region Area Storage Part

The conveyance region area storage part 81f stores, for each conveyance region, an area of each conveyance region calculated from the coordinates of the conveyance region, which are stored in the conveyance region position storage part 81d.

(g) Reservation Storage Part

The reservation storage part 81g stores density data of a weighed article, together with a reservation number of the weighed article, a weighing value, a weighing speed, a head supply target weight, the oscillation intensity and/or oscillation time of the dispersing part 10, the oscillation intensity and/or oscillation time of the radial parts 20, and other information.

Initial values for the oscillation intensity and oscillation time for the radial parts 20 are set to an intensity and time such that an article progresses in the conveyance direction by a distance of one of the region set in the conveyance region position storage part 81d during a single driving of the radial parts.

In other words, since the radial parts 20 are divided into five divisions in the conveyance direction in the present embodiment, the intensity and time are initially set so that all of the articles loaded on a single radial part 20 are supplied to the pool hopper 30 in five weighing cycles.

(2-9-2) Computation Part

The computation part 82 is configured primarily of the CPU 80a. The CPU 80a, in cooperation with the RAM 80c, reads and executes a control program stored in the ROM 80b and the HDD 80d, and thereby controls the operation of the combination weighing device 100. The computation part 82 has the article height calculation part 82a, the article loading weight calculation part 82b, and a driving data generating part 82c.

(a) Article Height Calculation Part

The article height calculation part 82a is an example of the height calculation part. The article height calculation part 82a calculates the height of the articles on the loading part for each conveyance region.

Specifically, the article height calculation part 82a receives, as a sensing result of the camera 60, a distance L1 to the region center for each conveyance region in a state in which articles are loaded, the distance L1 being outputted for each weighing cycle from the camera 60. Meanwhile, a distance L0 from the camera 60 to each conveyance region in a state in which there are no articles is stored for each conveyance region in the conveyance region distance storage part 81e. An article height L of each conveyance region is thereby calculated by subtracting L1 from L0 of the corresponding conveyance region. In other words, the article height calculation part 82a calculates the height of the articles of each conveyance region based on the distance L1 to the region center for each conveyance region in a state in which articles are loaded, the distance L1 being the sensing result of the camera 60.

(b) Article Loading Weight Calculation Part

The article loading weight calculation part 82b is an example of the loading quantity calculation part. The article loading weight calculation part 82b multiplies the article height L for each conveyance region calculated by the article height calculation part 82a by the area of the corresponding conveyance region stored in the conveyance region area storage part 81f, and also by the density of the articles stored in the reservation storage part 81g, and thereby calculates the article loading weight for each conveyance region. In other words, the article loading weight calculation part 82b calculates the article loading weight for each conveyance region based on the distance L1 to the region center for each conveyance region in a state in which articles are loaded, the distance L1 being the sensing result of the camera 60.

(c) Driving Data Generating Part

The driving data generating part 82c is an example of the supply control part. The driving data generating part 82c generates control instructions for controlling components (the dispersing part 10, the radial parts 20, the pool hoppers 30, the weighing hoppers 40, and other components) connected to the control device 80. The control instructions are sent to each component via a communication part not illustrated in the drawings, and are executed.

Generation of driving data for the radial part 20k will be described as an example of generation of driving data for the radial parts 20 by the driving data generating part 82c.

First, the driving data generating part 82c calculates the oscillation intensity of the radial part 20k corresponding to a supply weight to be supplied to the pool hopper at the next time based on the article loading weight in the furthest-downstream conveyance regions of the radial trough 21k (in the case of the radial trough 21k, the combined total article loading weight of the conveyance region Rk-1-1 and the conveyance region Rk-1-2) recorded in the conveyance region loading quantity storage part 81b.

Specifically, since the article loading weight of the furthest-downstream conveyance regions (referred to as next regions) of the radial part 20k is stored in the conveyance region loading quantity storage part 81b and known, this value is compared with a head supply target weight stored in the reservation storage part 81g. When the article loading weight of the next regions of the radial part 20k is within a predetermined range relative to the head supply target weight stored in the reservation storage part 81g, the driving data generating part 82c does not change the oscillation intensity.

When the article loading weight of the next regions of the radial part 20k is less than the supply target weight, the driving data generating part 82c calculates a weight shortage amount and increases the oscillation intensity so that a supply weight of articles supplied next is equal to the supply target weight. Because the relationship between the oscillation intensity and the conveyance distance is a proportional relationship in a predetermined oscillation region and the article loading weight in the conveyance regions one region upstream from the furthest-downstream regions of the radial part 20*k* (referred to as next-after-next regions, i.e., conveyance region R*k*-2-1 and conveyance region R*k*-2-2 in the radial trough 21*k*) is already known, the oscillation intensity to change is calculated so that the weight shortage amount is compensated with the articles in the next-after-next regions.

For example, when the article loading weight in the next regions is 30 g, the article loading weight in the next-after-next regions is 20 g, and the supply target weight is 40 g, the shortage weight amount is calculated to be 10 g. The oscillation intensity before being changed is 50, for example.

Because half of the articles (10 g) should be supplied from the next-after-next regions together with the articles in the next regions, it is apparent that a half distance of the next-after-next regions should be additionally conveyed. It is therefore calculated that the oscillation intensity is increased by half to supply a half amount on the next-after-next regions. Specifically, the oscillation intensity should be set to 75.

Conversely, when the article loading weight in the next regions of the radial part 20*k* is greater than the supply target weight, the driving data generating part 82*c* decreases the oscillation intensity. The oscillation intensity is calculated when reducing the oscillation intensity in the same manner as when increasing the oscillation intensity.

As described above, the driving data generating part 82*c* generates the oscillation intensity for the dispersing part 10 and the radial parts 20 based on the article loading weight for each conveyance region stored in the conveyance region loading quantity storage part 81*b*. In other words, the driving data generating part 82*c* generates the oscillation intensity for the radial parts 20 based on the article height for each conveyance region, which is used to calculate the article loading weight for each conveyance region. In still other words, the driving data generating part 82*c* generates the oscillation intensity for the radial parts 20 based on the state of the articles on the loading parts for each conveyance region (the distance L1 to the region center for each conveyance region in a state in which articles are loaded). The state of the articles on the loading parts for each conveyance region is outputted from the camera 60 and used to calculate the height of the articles of each conveyance region.

The driving data generating part 82*c* repeats an operation such as described above for each weighing cycle.

In the combination weighing device 100 of the present embodiment, while the article loading weight of each conveyance region is calculated for each weighing cycle in the manner described above, driving data are generated by the driving data generating part 82*c* based on the article loading weight of each conveyance region, and combination weighing operation is continued.

(3) Modifications

Modifications of the above first embodiment are described below. A plurality of modifications may be combined insofar as the modifications are not inconsistent with each other.

(3-1) Modification A

The conveyance regions of the radial troughs are divided into ten divisions in the combination weighing device 100 according to the first embodiment described above, but the conveyance regions may also be further subdivided. Since the calculation of the article loading weight is subdivided when the conveyance regions are subdivided, supply can be accurately controlled.

(3-2) Modification B

A TOF camera is used as the sensing part in the combination weighing device 100 according to the first embodiment described above, but the article height may instead be detected as an article state by a light-section method.

Due to continuity thereof with respect to a radiation direction of slit light in a light-section method, a conveyance region can be more finely subdivided in the conveyance direction than in a TOF system with respect to the radiation direction of slit light.

Since the calculation of the article loading weight is subdivided when the conveyance regions are subdivided, supply can be accurately controlled.

(3-3) Modification C

The TOF camera is used as the sensing part in the combination weighing device 100 according to the first embodiment described above, but a configuration may instead be adopted in which side walls of the radial troughs are tilted to form inverted-trapezoidal or inverted-V-shaped conveyance routes for articles, an image is captured by a camera from above, and the length and/or area of portions of side wall parts not obscured by articles are sensed as the state of articles on the radial troughs.

Adopting this configuration makes it possible to calculate the height of the articles. Subdivision of region divisions in the conveyance direction is thereby possible. Since the calculation of the article loading weight is subdivided when the region divisions are subdivided, supply can be accurately controlled.

(3-4) Modification D

A TOF camera is used as the sensing part in the combination weighing device 100 according to the first embodiment described above, but a pattern irradiation method may instead be used.

(3-5) Modification E

The article loading weight for each region of articles on the loading parts is used in combination weighing in the combination weighing device 100 according to the first embodiment described above, but the article loading weight for each region for the articles on the loading parts may also be used to judge the suitability of additional supply. It is thereby possible to prevent a reduction in weighing precision and/or a reduction in working rate in which a head becomes inoperable due to the inadvertent additional supply over the capacity thereof.

(3-6) Modification F

A case is described above in which the driving data generating part 82*c* controls the oscillation intensity of the radial parts 20 in the combination weighing device 100 according to the first embodiment, but, depending on the state and/or condition of the articles, the oscillation time of the radial parts 20 may be the subject of control, or both the oscillation intensity and the oscillation time of the radial parts 20 may be the subject of control. More accurate supply control is thereby possible.

(3-7) Modification G

Oscillating devices are used for the dispersing part 10 and/or the radial parts 20 in the combination weighing device 100 according to the first embodiment described above, but a belt system or a screw system may be adopted. Certain articles that absorb oscillations and cannot be conveyed can thereby be conveyed.

(3-8) Modification H

Control of the radial parts 20 in the combination weighing device 100 according to the first embodiment is described above, but the dispersing part 10 may be controlled in the same manner. More accurate supply control is thereby possible.

(3-9) Modification I

Only the weighing hoppers are used as combination subjects in combination weighing in the combination weighing device 100 according to the first embodiment described above, but the article loading weight values for each conveyance region may also be used as combination subjects.

A subsequent combination result such as the next and the next-after-next combination results can thereby be estimated, and weighing precision is therefore enhanced.

(3-10) Modification J

In the combination weighing device 100 according to the first embodiment described above, a configuration may be adopted in which a mutual relation between the oscillation intensity and/or oscillation time and the articles is measured using the article loading weight for each region for the articles on the loading parts. This configuration enables accurate calculation when calculating initial values and/or values during operation for the oscillation intensity and/or oscillation time, and the precision of supply control is therefore increased for all types of articles.

(3-11) Modification K

In the combination weighing device 100 according to the first embodiment described above, the radial parts 20 are arranged so as to surround the dispersing part 10, and the weighing hoppers 40 are arranged below the respective radial parts 20 thereof (see FIGS. 1 and 2).

The same configuration as that of the combination weighing device according to the first embodiment described above is also applicable to a so-called linear-arrangement combination weighing device.

(3-12) Modification L

In the combination weighing device 100 according to the first embodiment described above, the driving data generating part 82c controls the driving of the article conveyance parts (determines the oscillation intensity of the radial parts 20 in the first embodiment described above) based on the article loading weight for each region along the conveyance direction. The article loading weight for each region along the conveyance direction is calculated by the article loading weight calculation part 82b based on the height of the articles on the radial troughs 21 for each region along the conveyance direction. The height of the articles on the radial troughs 21 for each region along the conveyance direction is calculated by the article height calculation part 82a.

However, the present invention is not limited to this configuration.

For example, because the area of the conveyance regions and/or the article density used to calculate the article loading weight are not values which always change (which change only at such times as when the settings for conveyance regions are changed and/or the articles to be subjected to combination weighing are changed), the driving data generating part 82c may control driving of the radial parts 20 based on the height of the articles (which is a value corresponding to the article loading weight) on the radial troughs 21 for each region along the conveyance direction, calculated by the article height calculation part 82a, instead of based on the article loading weight. More specifically, the driving data generating part 82c may control driving of the radial parts 20 based on the height for each region along the conveyance direction, which is stored in association with a time in the conveyance region height storage part 81a, instead of based on the article loading weight for each region along the conveyance direction, which is stored in association with a time in the conveyance region loading quantity storage part 81b.

For example, instead of based on the height of the articles, the driving data generating part 82c may control driving of the radial parts 20 based on the distance L1 to the region center for each conveyance region of the loading parts in a state in which articles are loaded, the distance L1 being sensed by the camera 60. For example, when a correlation between the height of the articles and the distance L1 is ascertained in advance, even when driving of the radial parts 20 is controlled based on the distance L1 without calculating the height of the articles, the driving of the radial parts 20 can be controlled the same as when it is controlled based on the height of the articles. Specifically, a configuration may be adopted in which the value of the distance L1 for each region is stored in association with a time in the storage part 81, and driving of the radial parts 20 is controlled based on the stored information.

When driving of the radial parts 20 is controlled based on a value such as the distance L1 to the region center for each conveyance region of the loading parts in a state in which articles are loaded, and/or the height of the articles of each conveyance region of the loading parts, the value need not be a value represented by a unit system (e.g., the International System of Units). For example, when driving of the radial parts 20 is controlled using the distance L1, a value based on a different standard from that of a normal unit system may be used as the distance L1. As a specific example, when a standard is used whereby a quantity corresponding to 1 m in the International System of Units is represented as 200, a value whereby a quantity represented as 50 cm in the International System of Units is represented as 100 may be used as the distance L1.

(3-13) Modification M

In the combination weighing device according to the first embodiment described above, the camera 60 senses a physical quantity (the distance from the camera 60 to the center of each region) for ascertaining the height of the articles on the loading parts for each region along the conveyance direction of the radial parts 20 and a direction (width direction of the radial troughs 21) intersecting with (more specifically, orthogonal to) the conveyance direction. However, the present invention is not limited to this configuration. For example, a configuration may be adopted in which the camera 60 senses a physical quantity for ascertaining the height of the articles on the loading parts only for regions along the conveyance direction of the radial parts 20. The article height calculation part 82a may then calculate the height of the articles on the radial troughs 21 for each region along the conveyance direction based on the sensing result. The article loading weight calculation part 82b may also calculate the article loading weight on the radial troughs 21 for each region along the conveyance direction.

However, in order to more accurately control the supplying of articles, the camera 60 preferably senses the state of the articles on the radial troughs 21 for each of the plurality of regions along the direction (width direction of the radial troughs 21) intersecting with the conveyance direction of the radial parts 20. The article height calculation part 82a also preferably calculates the height of the articles on the radial troughs 21 for each region along the direction intersecting with the conveyance direction based on the sensing result. The article loading weight calculation part 82b also preferably calculates the article loading weight on the radial troughs 21 for each region along the direction intersecting with the conveyance direction.

(3-14) Modification N

The TOF camera is used as the sensing part in the combination weighing device 100 according to the first embodiment described above, but the present invention is not limited to this configuration.

The sensing part may be an optical displacement sensor, for example. The optical displacement sensor has a light source and a light-receiving element (position-sensitive device (PSD) and/or a charge-coupled device (CCD) or the like), and can sense the distance to an article as a state of the article by ascertaining a change in the position at which light radiated from the light source and reflected by the article forms an image on the light-receiving element.

The sensing part may also be an ultrasonic displacement sensor, for example. The ultrasonic displacement sensor has a sensor head for emitting ultrasonic waves and receiving ultrasonic waves reflected from an article, and can sense the distance to the article as a state of the article by measuring a time difference between emission and reception of the ultrasonic waves.

(3-15) Modification O

In the combination weighing device 100 according to the first embodiment described above, the article loading weight calculation part 82b calculates the article loading weight for each region based on the the height of the articles of each region along the conveyance direction, calculated by the article height calculation part 82a. However, the present invention is not limited to this configuration. For example, a configuration may be adopted in which the article loading weight calculation part 82b calculates the article loading weight through direct use of the distance L1 to the region center for each conveyance region of the loading parts in a state in which articles are loaded, the distance L1 being sensed by the camera 60.

(4) Other Examples

In the combination weighing device 100 according to the first embodiment described above, the camera 60 senses the state of the articles on the loading parts in non-contact manner, and the driving data generating part 82c controls driving of the article conveyance parts on the basis of a physical quantity relating to the height of the articles on the loading parts based on the sensing result. However, the combination weighing device may instead or additionally be configured as described below.

In the combination weighing device according to another example, the camera 60 senses, for example, the area of portions in which articles are present in each conveyance region as the state of the articles on the loading parts in non-contact manner. The area of portions in which articles are present in each conveyance region is a quantity correlated with the article loading weight on the loading part. The computation part of the control device 80 calculates the ratio of the area of the portions in which articles are present with respect to the total area for the conveyance regions based on the sensing result of the camera 60. For example, the computation part of the control device 80 calculates, for each region along the conveyance direction, the ratio of the area of the portions in which articles are present with respect to the total area based on the sensing result of the camera 60. The driving data generating part 82c controls the supply of articles by controlling the driving of the article conveyance parts based on the ratio of the area of the portions in which articles are present with respect to the total surface area for each region along the conveyance direction.

With this configuration, the supply of articles in the article conveyance parts also can be controlled with good precision, and the combination weighing device can be operated with increased weighing precision and/or without reduction in working efficiency.

REFERENCE SIGNS LIST 10 dispersing part (article conveyance part)
11 dispersing table (loading part)
20 (20a through 20n) radial parts (article conveyance parts)
21 (21a through 21n) radial troughs (loading parts)
30 (30a through 30n) pool hoppers
31 gate
32 pool hopper driving motor
40 (40a through 40n) weighing hoppers
41 gate
42 weighing hopper driving motor
43 load cell
60 camera
70 touch panel (display part)
80 control device
81 storage part
81a conveyance region height storage part
81b conveyance region loading quantity storage part
81c driving data storage part
81d conveyance region position storage part
81e conveyance region distance storage part
81f conveyance region area storage part
82 computation part
82a article height calculation part (height calculation part)
82b article loading quantity calculation part (loading quantity calculation part)
82c driving data generating part (supply control part)
90 article supplying unit (supplying unit)
100 combination weighing device

CITATION LIST

Patent Literature

[Patent Literature 1] Republished Patent Application WO 95/31702
[Patent Literature 2] Japanese Laid-open Patent Publication No. 2013-250143

The invention claimed is:

1. A combination weighing device comprising:
an article conveyance part having a trough and a driving part configured to drive the trough, the article conveyance part configured to drive the driving part and thereby cause articles to be conveyed to a hopper arranged downstream in a conveyance direction;
a sensing part configured to sense, in non-contact manner, a state of the articles on the trough; and
a supply control part configured to control supply of the articles by controlling driving of the article conveyance part based on a sensing result of the sensing part,
characterized in that:
the sensing part is configured to sense, for a plurality of regions arranged from an upstream side to a downstream side along the conveyance direction, the state of the articles for each of the regions; and
the supply control part is configured to control the driving based on a physical quantity relating to a height of the articles on the trough for each of the regions, the physical quantity being ascertained from the state of the articles of each of the regions.

2. The combination weighing device according to claim 1, characterized by further comprising,
a storage part configured to store the physical quantity for each of the regions in association with a time, wherein
the supply control part is configured to control the driving based on the physical quantity for each of the regions being stored in associated with the time in the storage part.

3. The combination weighing device according to claim 1, characterized by further comprising,
a height calculating part configured to calculate a height of the articles on the trough for each of the regions as the physical quantity for each of the regions, based on the sensing result of the sensing part.

4. The combination weighing device according to claim 1, characterized by further comprising,
a loading quantity calculating part configured to calculate a loading quantity of the articles on the trough for each of the regions as the physical quantity for each of the regions, based on the sensing result of the sensing part.

5. The combination weighing device according to claim 1, characterized in that
the sensing part is configured to sense the state of the articles at each of a predetermined cycle.

6. A combination weighing device comprising:
an article conveyance part having a dispersing table and a driving part configured to drive the dispersing table, the article conveyance part configured to drive the driving part and thereby cause articles to be conveyed to a hopper arranged downstream in a conveyance direction;
a sensing part configured to sense, in non-contact manner, a state of the articles on the dispersing table; and
a supply control part configured to control supply of the articles by controlling driving of the article conveyance part based on a sensing result of the sensing part, characterized in that:
the sensing part is configured to sense, for a plurality of regions arranged from an upstream side to a downstream side along the conveyance direction, the state of the articles for each of the regions; and
the supply control part is configured to control the driving based on a physical quantity relating to a height of the articles on the dispersing table for each of the regions, the physical quantity being ascertained from the state of the articles of each of the regions.

7. The combination weighing device according to claim 6, characterized by further comprising,
a storage part configured to store the physical quantity for each of the regions in association with a time, wherein
the supply control part is configured to control the driving based on the physical quantity for each of the regions being stored in associated with the time in the storage part.

8. The combination weighing device according to claim 6, characterized by further comprising,
a height calculating part configured to calculate a height of the articles on the dispersing table for each of the regions as the physical quantity for each of the regions, based on the sensing result of the sensing part.

9. The combination weighing device according to claim 6, characterized by further comprising,
a loading quantity calculating part configured to calculate a loading quantity of the articles on the dispersing table for each of the regions as the physical quantity for each of the regions, based on the sensing result of the sensing part.

10. The combination weighing device according to claim 6, characterized in that
the sensing part is configured to sense the state of the articles at each of a predetermined cycle.

11. A combination weighing device comprising:
an article conveyance part having a surface extending along a conveyance direction and an oscillator configured to drive the surface, the article conveyance part configured to drive the surface and thereby cause articles to be conveyed to a hopper arranged downstream in the conveyance direction;
a camera configured to sense, in non-contact manner, a state of the articles on the surface; and
a processor communicatively coupled with a memory and configured to control supply of the articles by controlling driving of the article conveyance part based on a sensing result of the camera, characterized in that:
the camera is configured to sense, for a plurality of regions arranged from an upstream side to a downstream side along the conveyance direction, the state of the articles for each of the regions; and
the processor is configured to control the driving based on a physical quantity relating to a height of the articles on the surface for each of the regions, the physical quantity being ascertained from the state of the articles of each of the regions.

12. The combination weighing device according to claim 11, characterized by further comprising,
the memory configured to store the physical quantity for each of the regions in association with a time, wherein
the processor is configured to control the driving based on the physical quantity for each of the regions being stored in associated with the time in the memory.

13. The combination weighing device according to claim 11, characterized in that
the processor is configured to calculate a height of the articles on the surface for each of the regions as the physical quantity for each of the regions, based on the sensing result of the camera.

14. The combination weighing device according to claim 11, characterized in that
the processor is configured to calculate a loading quantity of the articles on the surface for each of the regions as the physical quantity for each of the regions, based on the sensing result of the camera.

15. The combination weighing device according to claim 11, characterized in that
the camera is configured to sense the state of the articles at each of a predetermined cycle.

16. The combination weighing device according to claim 1, characterized in that
the plurality of regions include regions arranged in a width direction of the conveyance direction.

17. The combination weighing device according to claim 6, characterized in that
the supply control part is configured to control the driving part based on a supply target quantity, the physical quantity for the region arranged at the downstream side, and the physical quantity for the region arranged at the upstream side.

18. The combination weighing device according to claim 1, characterized in that
the plurality of regions include regions arranged in a width direction of the conveyance direction.

19. The combination weighing device according to claim 6, characterized in that
the supply control part is configured to control the driving part based on a supply target quantity, the physical quantity for the region arranged at the downstream side, and the physical quantity for the region arranged at the upstream side.

* * * * *